United States Patent
Rune et al.

(10) Patent No.: US 9,198,114 B2
(45) Date of Patent: *Nov. 24, 2015

(54) SYSTEMS AND METHODS FOR SELECTING A NETWORK ACCESS SYSTEM

(71) Applicant: Telefonaktiebolaget L M Ericsson (publ), Stockholm (SE)

(72) Inventors: Johan Rune, Lidingo (SE); Joachim Sachs, Aachen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/226,154

(22) Filed: Mar. 26, 2014

(65) Prior Publication Data

US 2014/0295833 A1    Oct. 2, 2014

Related U.S. Application Data

(63) Continuation of application No. 13/758,426, filed on Feb. 4, 2013, now Pat. No. 8,687,486, which is a continuation of application No. 12/487,267, filed on Jun. 18, 2009, now Pat. No. 8,391,141.

(51) Int. Cl.
*G01R 31/08* (2006.01)
*H04W 48/06* (2009.01)
*H04W 48/20* (2009.01)
*H04W 28/08* (2009.01)
*H04W 4/00* (2009.01)
*H04W 48/08* (2009.01)

(52) U.S. Cl.
CPC .............. *H04W 48/06* (2013.01); *H04W 28/08* (2013.01); *H04W 48/20* (2013.01); *H04W 48/08* (2013.01)

(58) Field of Classification Search
None
See application file for complete search history.

(56) References Cited

U.S. PATENT DOCUMENTS

2006/0258350 A1* 11/2006 Roy et al. ................... 455/435.1
2008/0039087 A1* 2/2008 Gallagher et al. ......... 455/435.2

FOREIGN PATENT DOCUMENTS

| | | |
|---|---|---|
| EP | 1503606 A1 | 2/2005 |
| WO | 0018164 A1 | 3/2000 |
| WO | 0176273 A2 | 10/2001 |
| WO | 2004043104 A1 | 5/2004 |
| WO | 2007129479 A1 | 11/2007 |
| WO | 2009025494 A2 | 2/2009 |
| WO | 2009069918 A2 | 6/2009 |

OTHER PUBLICATIONS

International Search Report and Written Opinion issued in PCT/SE2009/050941 on Feb. 22, 2010, 10 pages.
International Preliminary Report on Patentability issued in International application No. PCT/SE2009/050941 on Dec. 20, 2011, 7 pages.
Office Action issued in Japanese Patent Application No. 2012-516029 on Apr. 16, 2013, 4 pages.

\* cited by examiner

*Primary Examiner* — Eunsook Choi
(74) *Attorney, Agent, or Firm* — Rothwell, Figg, Ernst & Manbeck, P.C.

(57) ABSTRACT

A system according to some embodiments of the invention includes (1) a component (e.g. ANDSF) that provides a cell selection rule to a UE and (2) a component (e.g. an access node) that provides the UE with information about the load in the cell currently utilized by the UE. This enables the UE to determine whether to leave the cell, which may be a 3GPP cell, and use a different cell, which may be a non-3GPP cell, by applying the cell selection rule in conjunction with its knowledge about the load of the cell.

18 Claims, 6 Drawing Sheets

SYSTEMS AND METHODS FOR SELECTING A NETWORK ACCESS SYSTEM

This application is a continuation of application Ser. No. 13/758,426, filed on Feb. 4, 2013 (published as US 20130273932 A1), which is a continuation of application Ser. No. 12/487,267, filed on Jun. 18, 2009 (now U.S. Pat. No. 8,391,141). The above identified applications and patent publications are incorporated by reference herein.

TECHNICAL FIELD

The present invention relates to communication networks. Particular aspects of the present invention relate to network access system selection.

BACKGROUND

It is expected that network access systems of various kinds, especially wireless network access systems (e.g. access nodes, such as base stations, of various types), will become increasingly ubiquitous. Accordingly, it is expected that mobile terminals (e.g. mobile phones and other mobile terminals) will be configured to be able to communicate with several different types of base stations, thereby providing flexibility to select the best type of base station to use for any given communication session. That is, it is expected that mobile terminals (a.k.a., user equipments (UEs)) will have multiple access interfaces. For example, in Long Term Evolution (LTE)/System Architecture Evolution (SAE) networks, also known as Evolved Packet System (EPS), multi-access is a key element. This means that an EPS UE will often face a situation where it has to select which out of multiple available network access systems to use (i.e. the UE has to perform access selection).

To leverage the benefits of having these multiple access interfaces it is desirable to have mechanisms and procedures in place to ensure that a mobile terminal uses its available access interfaces and network access systems as efficiently as possible. In this context, the perspectives of both the user of the mobile terminal and the operator of the network access system should preferably be considered. Accordingly, a new functional entity referred to as Access Network Discovery and Selection Function (ANDSF) has been introduced into the Third Generation Partnership Project (3GPP) network architecture, and corresponding functionality has been introduced in the UE (sometimes referred to as ueANDSF). The principle of ANDSF based access selection is that the ANDSF supplies rules/instructions to a UE, and the UE applies these rules/policies to its current contextual situation to arrive at an access selection result. That is, the ANDSF controls access selection indirectly and on a non-real-time scale. Hence, the current ANDSF access selection mechanism is not well suited to provide, for example, load balancing functionality.

What is desired are improved systems and methods for selecting a network access system. Henceforth the terms "access selection" and "cell selection" will be used as equivalents.

SUMMARY

A system according to some embodiments of the invention includes (1) a component (e.g. ANDSF) that provides a cell selection rule to a UE and (2) a component (e.g. an access node) that provides the UE with information about the load in the cell currently utilized by the UE. This enables the UE to determine whether to leave the cell, which may be a 3GPP cell (i.e. a cell wherein 3GPP radio access technology is used, such as LTE, WCDMA, HSPA, Global System for Mobile communication (GSM), General Packet Radio Service (GPRS) or Enhanced Data rates for GSM Evolution (EDGE)), and use a different cell, which may be a non-3GPP cell, by applying the cell selection rule in conjunction with its knowledge about the load of the cell. An advantage of this aspect of the invention is that extra-3GPP load balancing can be achieved while the general principle for ANDSF based access selection is preserved. That is, the ANDSF provides the cell selection rules, while the UE monitors its environment and applies the rules. In some embodiments, the access node can provide the UE with information about the load by transmitting a cell preference indicator (CPI) value. The transmission may be a broadcast or unicast transmission. In some embodiments, timers are introduced to govern how long a load-triggered access selection decision is valid in a UE, both after decisions to move and not to move.

In one particular aspect, the invention provides a UE load balancing method. In some embodiments, the method begins with the UE receiving a message comprising a cell selection rule. Next, the UE receives a cell preference indicator (CPI) value transmitted from an access node (e.g. a 3GPP access node). The CPI value is associated with the cell currently utilized by the UE. Next, the UE uses the cell selection rule in conjunction with the CPI value to determine whether to continue utilizing the cell or to move to a second cell (e.g. a cell serviced by a non-3GPP access node). In some embodiments, the CPI value is a binary load indicator value that indicates whether the cell is considered to be loaded or unloaded. In other embodiments, the CPI value is a load indicator value that indicates one of three or more cell load levels. In still other embodiments, the CPI value indicates whether, or the degree to which, the first cell is suitable for access. In some embodiments, the step of using the cell selection rule to determine whether to utilize the second cell includes generating a random or pseudo-random number and comparing the generated number with a value that is a function of the CPI value. The cell selection rule may specify a condition, and the step of using the cell selection rule in conjunction with the CPI value to determine whether to utilize the second cell comprises using the CPI value to determine whether the condition is true.

In another aspect, the invention provides method for load balancing in a communication network. The method may begin by transmitting to a UE a message comprising a cell selection rule. Next, a message comprising a cell preference indicator (CPI) value that is associated with a first cell is created by an access node. This message is then transmitted to the UE from the access node. Advantageously, the UE is configured to use the received cell selection rule in conjunction with the received CPI value to determine whether to utilize the first cell or a second cell. In some embodiments, the step of transmitting the message containing the CPI value comprises transmitting the message on a broadcast channel (BCH) or a downlink shared channel (DL-SCH). In other embodiments, the step of transmitting the message containing the CPI value comprises unicasting the message to the UE. In some embodiments, prior to unicasting the CPI value to the UE, the access node determines whether the UE is transmitting and/or receiving primarily traffic with low capacity demands. If so, the access node will unicast the CPI value to the UE, otherwise the access node will not unicast the CPI value to the UE. In some embodiments, the access node determines the load on the first cell and determines a target number of UEs based on the determined load. Next, the access node selects not more than the target number of UEs and transmits a CPI value to each of the selected UEs.

In another aspect, the present invention provides an improved UE. The improved UE includes (1) a transmit and receive circuit operable to (a) receive a cell selection rule and (b) receive, from an access node, a cell preference indicator (CPI) value associated with a cell. The improved UE also includes a data processing system configured to use the cell selection rule in conjunction with the received CPI value to determine whether to utilize the cell or a different cell.

In another aspect, the present invention provides an improved access node. The improved access node includes (1) a transmit and receive circuit operable to transmit and receive data and (2) a data processing system. Advantageously, the data processing system is configured to (a) determine the load of a cell serviced by the access node, (b) set a cell preference indicator (CPI) value based on the determined cell load, (c) generate a message comprising the CPI value, and (d) cause the transmit and receive circuit to transmit the message to one or more UEs in wireless communication with the access node.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

A term/concept which is relevant for the following detailed description of the invention is "extra-3GPP load balancing". In this document "extra-3GPP load balancing" refers to load balancing between the domain of 3GPP accesses (i.e. the accesses using access technologies specified by 3GPP, e.g. LTE, WCDMA, HSPA, GSM, GPRS and/or EDGE, possibly also including CDMA2000® which is specified by 3GPP2) and the domain of non-3GPP accesses (i.e. accesses using access technologies which are not specified by 3GPP). Hence, extra-3GPP load balancing mechanisms are used e.g. to achieve good load balance between a cell serviced by an access node using 3GPP access technology and a cell serviced by an access node using non-3GPP access technology. Potentially, extra-3GPP load balancing mechanisms could also be used for balancing the load between two cells serviced by access node(s) using non-3GPP access technologies, but extra-3GPP load balancing mechanisms are typically not used for load balancing between cells serviced by access node(s) using 3GPP access technologies.

Figure 1:
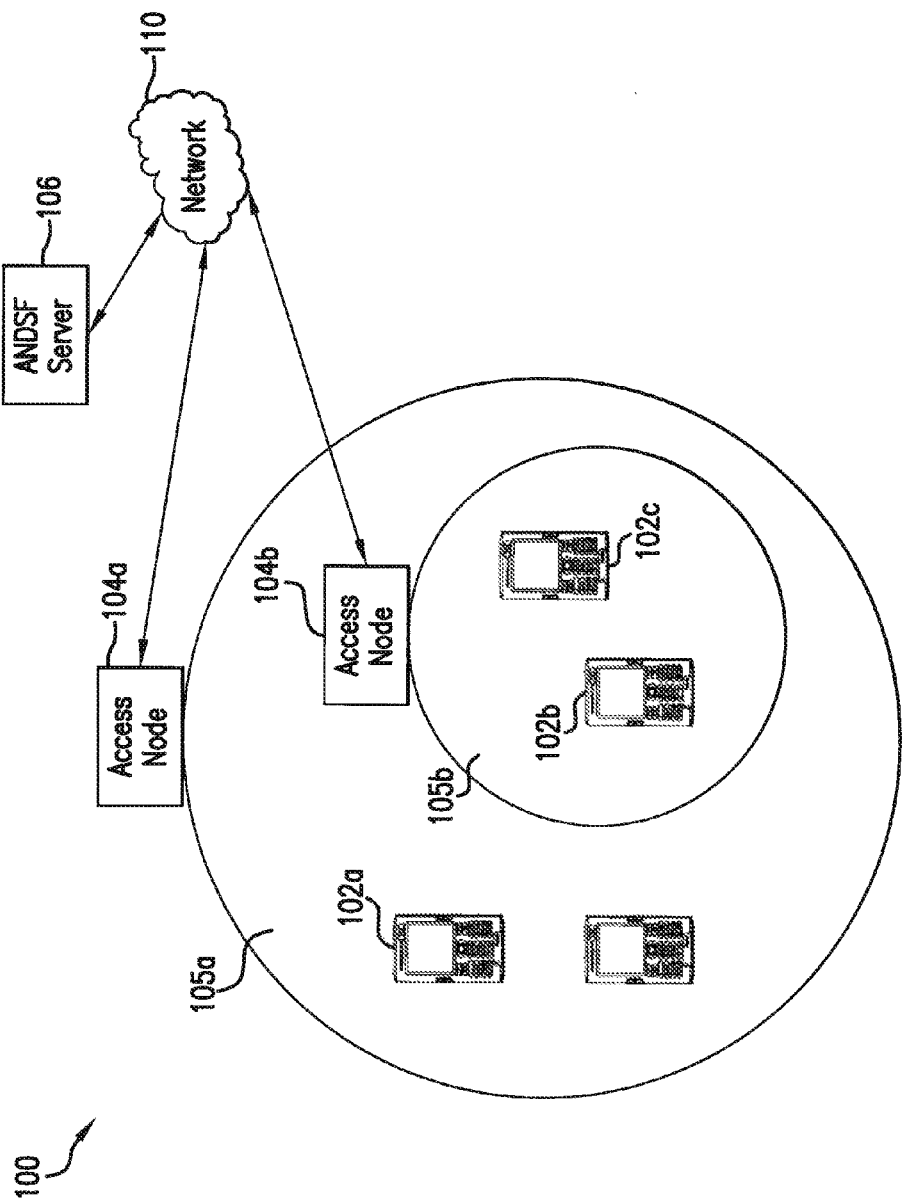
FIG. 1 illustrates a communication system according to some embodiments of the invention.

Referring now to FIG. 1, FIG. 1 illustrates an exemplary communication system 100 according to some embodiments of the invention. As shown in FIG. 1, communication system 100 includes multiple access nodes 104 (e.g. access node 104a and access node 104b). Each access node 104 may provide a number of UEs 102 with access to network 110. For example, access node 104a may provide UEs within coverage area (i.e. cell) 105a (i.e., UEs 102a-102d) with access to network 110, while access node 104b may provide UEs within coverage area (i.e. cell) 105b (i.e., UEs 102b-102c) with access to network 110. That is, access node 104a serves cell 105a and access node 104b serves cell 105b.

In some embodiments, access node 104a may be of a different type than access node 104b. For example, access node 104a may be a 3GPP access node (i.e. an access node using 3GPP access technology, e.g., an LTE, high speed packet access (HSPA), wideband code division multiple access (WCDMA), Global System for Mobile Communication (GSM), GSM Enhanced Data Rates for GSM Evolution (EDGE) Radio Access Network (GERAN), or possibly 3GPP2 CDMA2000® access node), while access node 104b may be a non-3GPP access node (e.g., Worldwide Interoperability for Microwave Access (WiMAX), Wireless Local Area Network (WLAN), or other non-3GPP access node).

As also illustrated in FIG. 1, system 100 may include a server 106 that provides ANDSF functionality. That is, server 106 may be configured to provide to UEs 102 one or more cell selection rules. Advantageously, at least one access node (e.g., access node 104a) is configured to transmit a cell preference indicator (CPI) value to one or more of UEs 102 that are currently utilizing cell 105a (e.g., UEs 102a-102b), and the UEs receiving the CPI value are configured to use a cell selection rule provided by server 106 in conjunction with the CPI value provided by access node 104a to determine whether to continue "utilizing" cell 105a or utilize a different cell (e.g., cell 105b). A UE "utilizes" a cell by connecting to or camping on the access node 104 (or component thereof) that serves the cell.

In some embodiments, the CPI value conveyed to the UEs may come in different variants with different properties. For example, in some embodiments, the CPI value is a binary load indicator value that indicates whether a particular cell (e.g., the cell served by the access node that conveyed the CPI value) is loaded (e.g., highly loaded or completely loaded) or unloaded (e.g., completely unused or just lightly used). In other embodiments, the CPI is a "nuanced" load indicator. That is, for example, the CPI is a value that indicates one of three or more cell load levels (e.g., low load, medium load, and high load).

Advantageously, by providing a UE 102 with knowledge about the load in the cell the UE is currently utilizing, a network operator may proactively control load-balancing by having the ANDSF server 106 convey to the UE 102 a cell selection rule conditioned on the load of a cell. This way, the general principle for ANDSF based cell selection is preserved with the ANDSF providing the cell selection rules while the UE monitors contextual parameters (e.g., cell load, traffic type, etc.) and executes the cell selection rule using the contextual parameters as input.

In some embodiments, a cell selection rule may instruct a UE 102 to, by default, utilize the available access node that has the highest capacity and bit-rate. In many cases, such an access node will be an LTE base station. Hence, providing a UE 102 with information about the load in LTE cells so that the UE can move away from overloaded LTE cells and utilize non-3GPP cells will enable extra-3GPP load-balancing. In some embodiments, the task to inform a UE of a cell 105's load condition is placed in the node that has the most readily available knowledge about the load situation, which in most cases is the access node 104 that serves the cell 105. In the LTE environment the access node 104 is referred to as an evolved NodeB (eNB). In WCDMA/HSPA it may include a Node B, but the task to inform the UE of a cell's load in a WCDMA/HSPA network may also be placed in a Radio Network Controller (RNC) node controlling multiple Node Bs. That is, the access node 104 may include a Node B and RNC.

In other embodiments, the CPI may be used as a general indicator (as opposed to merely a load indicator) that indicates the degree to which the cell is suitable for access. For example, in some embodiments, the CPI may have only two states: (1) "allowed" and (2) "not allowed." An access node may set the CPI value to "not allowed" when the cell is loaded. That is, the access node may use the general CPI as a binary load indicator. In addition, however, the access node may also set the CPI value to "not allowed" when, for example, the cell is taken out of service or when the network operator desires to save energy. Thus, in this embodiment, while the CPI is a binary indicator it is more general than a simple binary load indicator. In other embodiments, the CPI may have three or more states (e.g. low, moderate, high). This is useful to achieve smooth load balancing (e.g. gradually decrease the number of UEs in the cell). This may be desired when the access node is being taken out of service, e.g. for maintenance or upgrades.

In other embodiments, the CPI value may be a probability value (or other value) that a UE uses in determining whether or not to use the cell for camping or connected mode access. The CPI value transmitted to a UE at any particular time may reflect the load in the cell at that time or be used for other purposes as described above with respect to the general indicator. In this embodiment, by adjusting the CPI value, it is possible to regulate the fraction of UEs that choose to use the cell and the fraction that select another cell.

There are a variety of ways in which an access node 104 may provide a CPI value to a set of one or more UEs 102. For example, the access node may broadcast the load indictor (i.e. transmit the load indicator so that it can be received by any UE that is listening to the broadcast). Broadcasting the CPI value is an efficient way to simultaneously convey the CPI value to all UEs in the cell (including both active and idle UEs). In some systems (e.g. LTE), one way to broadcast the CPI value is to include it with the system information that is repeatedly broadcast in the cell by the access node. For example, the CPI value may be included in the "MasterInformationBlock (MIB)" that is periodically broadcast using the Broadcast Channel (BCH). The LTE MIB currently has a field of 10 unused bits and one or more of these unused bits could be used to carry the CPI value. As another example, the CPI value may be included in one of the SystemInformation-Blocks (SIBs) that is transmitted on the Downlink Shared Channel (DL-SCH) of LTE. The CPI value could also be placed in a "non-critical extension" of the "SystemInformation Message", which is an open-ended mechanism for backwards compatible extensions of the system information with parameters which may be skipped by UEs that cannot interpret the information, but it may also be included as a regular system information parameter.

Another way the access node 104 may provide a CPI value to a set of UEs is to unicast the CPI value to each UE in the set (i.e. to send a separate message to each UE with the UE as the dedicated receiver). For example, for each UE included in the set, the access node may transmit the CPI value so that it is received only by the UE. A benefit of using unicast instead of broadcast to convey the CPI value is that the access node can direct the CPI value to selected UEs. This allows the access node to, for example, send a CPI value indicating an overload condition only to those UEs that the access node has determined will suffer the least from leaving the cell for an another cell (e.g. UEs transmitting and/or receiving primarily traffic with low capacity demands, such as best-effort or low bit rate traffic). For unicast delivery, the CPI value may be included in a Radio Resource Control (RRC) message sent from the access node to the UE, or it may be included in a lower layer protocol (e.g. Media Access Control layer) or in a higher layer. Additionally, other signaling mechanisms could be used, such as signaling over the Internet Protocol (IP) (e.g. OMA Device Management) or IEEE 802.21 based signaling mechanisms. The CPI value could be an optional parameter in any unicast RRC message, but it could also be included in all unicast RRC messages or transmitted in a dedicated message. Preferably, the access node "opportunistically" transmits the CPI value to the UE. For example, when the access node determines that it should transmit a CPI value to a UE, the access node may not transmit the CPI value immediately to the UE, but may wait until the access node has other data, e.g. RRC related data, to send to the UE and then transmit to the UE the CPI value along with the other data.

Because the decision to move to the another cell is ultimately controlled by a cell selection rule and because not all UEs in the cell may have the possibility to move to a another cell (e.g. because they lack the appropriate interface or are out of coverage of the concerned access), it may be that not all the UEs that receive an overload indication (e.g. a CPI value set to "loaded" or "not allowed") will move to the other cell and the access node cannot predict how large a fraction of the UEs will move to the other cell. To compensate for this, the access node may choose to send the overload indication to more UEs than the access node would actually want to leave the cell. This, of course, may lead to more UEs leaving the cell than is desired. A possible way around this problem is that the access node first sends the overload indication to exactly the number of UEs it would like to move from the cell for optimal load-balancing and then wait and see what happens. If not all the contacted UEs have left the cell after a certain time, the access node may send the overload indication to additional UEs and so on. Another option is to send the overload indication to all UEs in the cell. When a suitable number of UEs has left the cell because of the signaled overload condition, the cell will not be overloaded anymore and the access node can change the load indication to stop further UEs from leaving the cell for load-balancing reasons.

Figure 2:
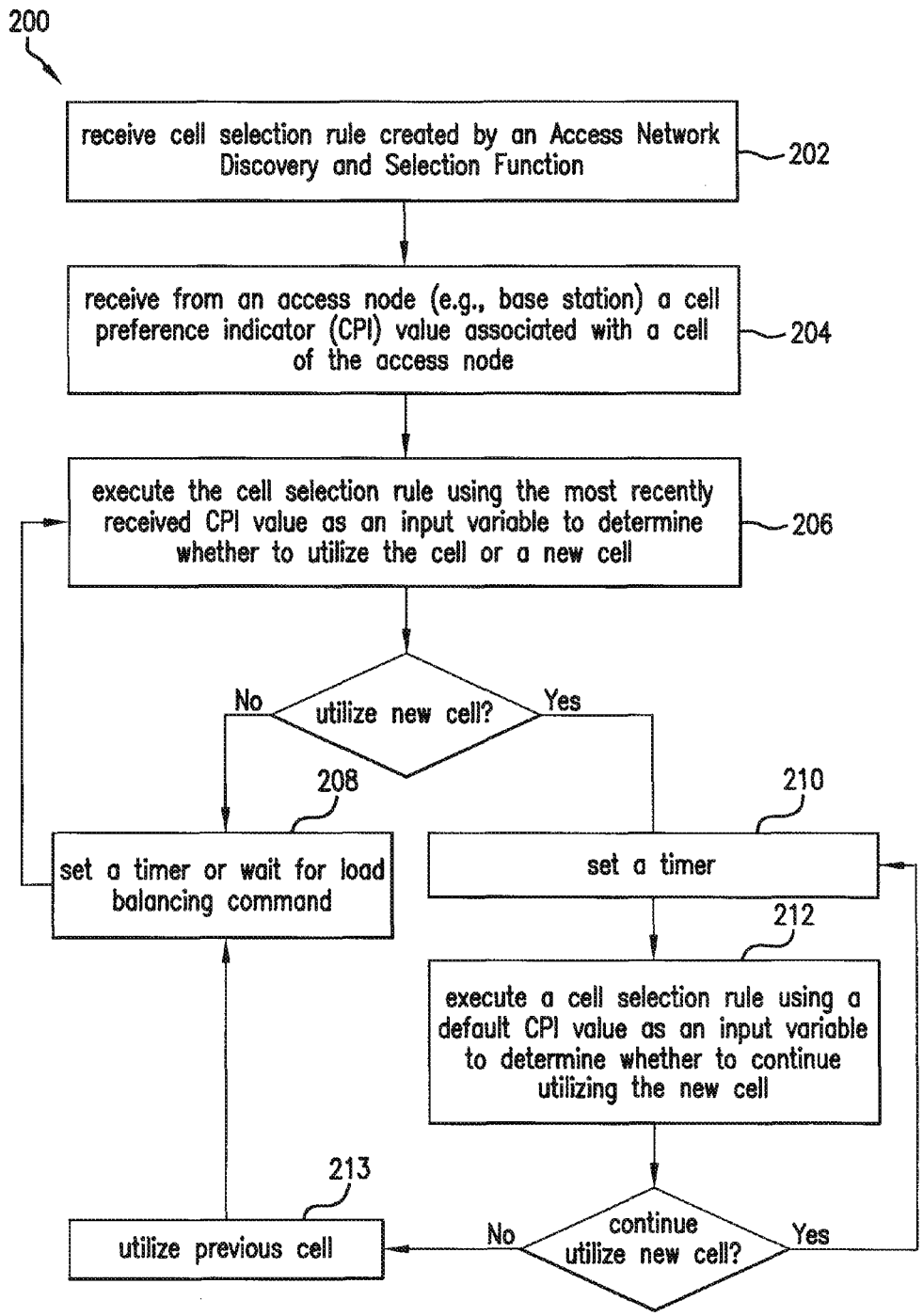
FIG. 2 is a flow chart illustrating a process according to some embodiments of the invention.

Referring now to FIG. 2, FIG. 2 is a flow chart illustrating a process 200 according to some embodiments of the invention. Process 200 is a process performed by a UE (e.g., UE 102a) that is utilizing a particular cell (e.g. cell 105a, which is serviced by access node 104a). Process 200 may begin in step 202, where UE 102a receives a cell selection rule. UE 102a may receive the cell selection rule from server 106. UE 102a may pull (e.g. request) the rule from server 106 or server 106 may push (e.g. send unsolicitedly) the rule to UE 102a. In step 204, UE 102a receives from access node 104a a CPI value, which, as discussed above, may be broadcast or unicast. Next (step 206), UE 102a executes the cell selection rule using the CPI value it most recently received from access node 104a to determine whether it should continue utilizing cell 105a or utilize another cell (e.g. cell 105b).

In some embodiments, the cell selection rule specifies a condition. Accordingly, in some embodiments, UE 102a executes the cell section rule by determining whether the condition is true. If UE 102*a* determines that the condition is true, then UE 102*a* should perform a specific action, which also may be specified by the cell selection rule.

An example cell section rule may be as follows: "condition=>CPI value='loaded'; action=>WiMAX, WLAN". When UE 102*a* executes this cell selection rule, HE 102*a* will determine whether the condition is true (i.e. UE 102*a* will determine whether the CPI value it received in step 204 equals the value of "loaded"). If the condition is true, then HE 102*a* will perform the specified action. In this example, the action is to discontinue utilizing the current cell and utilize a WiMAX cell if one is available, otherwise utilize WLAN cell if one is available. If neither a WiMAX nor WLAN cell is available, the UE 102*a* will continue utilizing the current cell. Accordingly, as illustrated, the action of the cell selection rule may specify a set (e.g. ordered list) of cell types.

For illustration, Table 1 below illustrates other possible cell section rules.

TABLE 1

Cell Selection Rules

| Condition(s) | Action(s) |
|---|---|
| CPI value = 'loaded' .AND. accessType = LTE .AND. serviceType = low bit rate or best-effort randNum( ) < f(CPI value) | WiMAX, WLAN |
| randNum( ) < 0.6 .AND. CPI value = 'loaded' .AND. serviceType = low bit rate or best-effort | WiMAX, WLAN |
| CPI value = 'loaded' | WiMAX, WLAN |
| CPI value = 'not loaded' .AND. serviceType = low bit rate | WiMAX |

The first cell selection rule in Table 1 illustrates that the condition may include logic (e.g. binary logic). According to this rule, UE 102*a* will discontinue utilizing the current cell if: (a) the CPI value is set to 'loaded', (b) the access node that UE 102*a* is currently utilizing is an LTE access node (e.g. an eNB), (c) UE 102*a* is primarily transmitting and/or receiving low bit rate or best-effort traffic, and (d) UE 102*a* has available to it a WiMAX or WLAN cell that it can utilize. The second cell selection rule in Table 1 illustrates a probability based cell selection rule. When UE 102*a* executes this cell selection rule, UE 102*a* will generate a random number (e.g. a pseudo-random number) and compare the generated random number with a value that is a function f( ) of the CPI value. In this example, if the generated random number is less than f(CPI value), then UE 102*a* will perform the specified action. In some embodiments, f(CPI value)=CPI value×C, where C could be any value. In other embodiments, f(CPI value)=CPI value raised to the power of C. In embodiments where CPI value is a binary load indicator, then f(CPI value) may equal X if CPI value='loaded,' otherwise f(CPI value) may equal Y. The third cell selection rule is also a probability based rule. Probability based cell selection rules allow simple control of UE or UE group behavior, while at the same time avoiding complex cell selection rules. The fourth cell selection rule illustrates that a cell selection rule may contain a set of conditions and a corresponding set of actions.

Referring back to FIG. 2, if UE 102*a* determines based on the cell selection rule and the CPI value that it should continue utilizing cell 105*a*, then UE 102*a* may set a timer to expire after some configurable amount of time or wait for a load balancing command from access node 104*a* (step 208). In response to the timer expiring (or in response to receiving the load balancing command), UE 102*a* again performs step 206. This feature of setting a timer forces UE 102*a* to re-execute the cell selection rule at some later point in time. This is advantageous in embodiments where the cell selection rule is a probability based rule because, without such re-execution of the cell selection rule, the load balancing may be too rigid. For instance, in an cell overload situation, if an insufficient number UEs leave the cell, then this undesirable situation may persist if the UEs' probability based cell section decision was not reconsidered. Accordingly, a UE should start a timer after a probability based decision to remain in the cell and when the timer expires, this should trigger a new evaluation of the cell selection rule, which may or may not result in the UE moving to a new cell. The timer may be fixed (i.e. the same for all UEs), but random timers within a certain interval may result in a smoother load balancing operation.

If UE 102*a* determines based on the cell selection rule and the CPI value that it should discontinue utilizing cell 105*a*, then UE 102*a* will begin utilizing a new cell (e.g. cell 105*b*) and may set a timer to expire after some configurable amount of time (step 210). Upon expiration of the timer, UE 102*a* executes a cell selection rule (e.g. the one received in step 202 or a different rule) using a default CPI value as an input variable to determine whether to continue utilizing the new cell (step 212). If UE 102*a* determines based on the cell selection rule and the default CPI value that it should continue utilizing the new cell, then process 200 returns to step 210, otherwise process 200 goes to step 213, where UE 102*a* stops utilizing cell 105*b* and resumes utilizing cell 105*a*. After step 213, process 200 proceeds to step 208. The timer is set in step 210 because UE 102*a*'s decision to leave cell 105*a* and move to cell 105*b* should not last forever. A timer is used to force UE 102*a* to reevaluate a cell selection rule because when UE 102*a* is utilizing cell 105*b* it may have no knowledge of the state of cell 105*a* as access node 104*b* may not have the means to provide to UE 102*a* information regarding the state of cell 105*a*. Preferably, to avoid large groups of UEs returning to cell 105*a*, the timer may be set to a random value within a certain interval.

Figure 3:
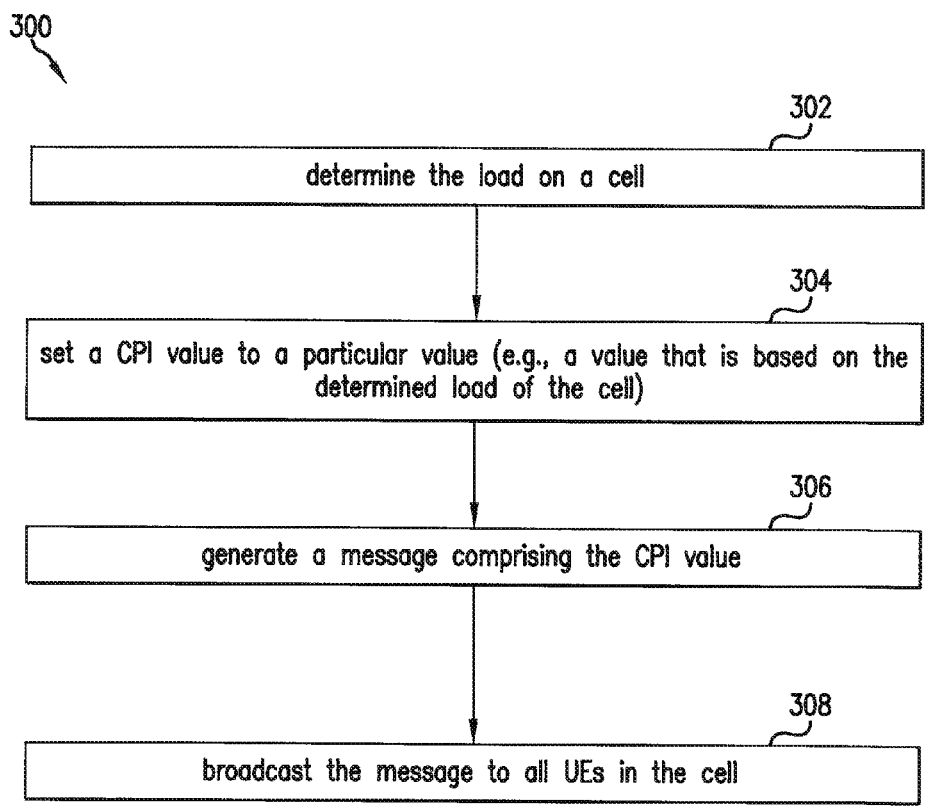
FIG. 3 is a flow chart illustrating a process according to some embodiments of the invention.

Referring now to FIG. 3, FIG. 3 is a flow chart illustrating a process 300 according to some embodiments. Process 300 may be performed by a 3GPP access node (e.g. access node 104*a*). Process 300 may begin in step 302, where access node 104*a* determines the load of one of its cells. Next (step 304), access node 104*a* sets a CPI value to a particular value (e.g. a value that is based on the determined load of the cell). For instance, if the CPI is a nuanced load indicator and access node 104 determines that the load of the cell is normal, then access node 104*a* would set the CPI value to "normal." Next (step 306), access node 104*a* generates a message that includes the CPI value. As discussed above, access node 104*a* may generate a MIB or SIB and include the CPI value in the MIB or SIB. Next (step 308), access node 104*a* broadcasts the message containing the CPI value. In an LTE system, access node 104*a* may broadcast the message using the Broadcast Channel (BCH) or may broadcast the message using the Downlink Shared Channel (DL-SCH).

Figure 4:
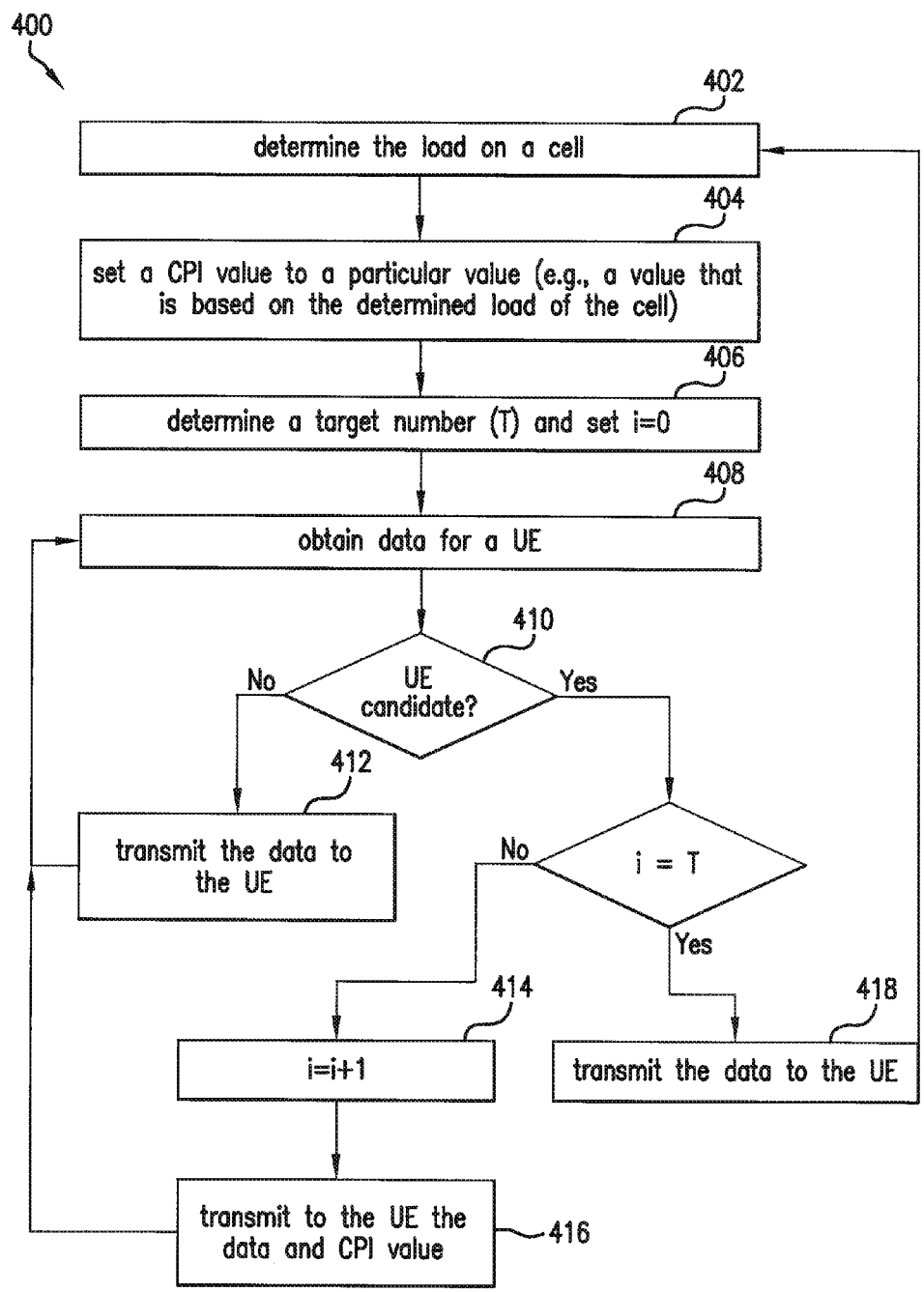
FIG. 4 is a flow chart illustrating a process according to some embodiments of the invention.

Referring now to FIG. 4, FIG. 4 is a flow chart illustrating a process 400 according to some embodiments. Process 400 may be performed by a 3GPP access node (e.g. access node 104*a*). Process 400 may begin in step 402, where access node 104*a* determines the load of one of its cells. Next (step 404), access node 104*a* sets a CPI value to a particular value (e.g. a value that is based on the determined load of the cell). Next (step 406), access node 104*a* determines a target number (T) of UEs and sets a counter (i) equal to zero (0). The target number may be set to the number of UEs that access node 104*a* would like to have moved to another cell (or it may be set to a higher or lower number). In step 408, access node 104a obtains (e.g., receives or generates) data intended for a UE. Next (step 410), access node 104a determines whether the UE is a candidate UE for being moved to another cell. For example, in some embodiments a UE is a candidate UE if and only if it is transmitting and/or receiving primarily traffic with low capacity demands (e.g. low bit rate traffic or best effort traffic). If the UE is not a candidate, then access node 104a will transmit to the UE the data obtained in step 408 (step 412). After step 412, process 400 may return to step 408. If the UE is a candidate, access node 104a determines whether the counter i equals the target number T. If i=/=T, then access node will increment i (step 414) and transmit to the UE a message containing data obtained in step 408 and the CPI value set in step 404 (step 416). Advantageously, each UE that receives a message containing a CPI value will execute a cell selection rule using the received CPI value. After step 416, process 400 may return to step 408. If i=T, then access node 104a will transmit to the UE the data received in step 408 (step 418). After step 418, process 400 may return to step 402. By implementing this process, access node 104 can indirectly control the load in the cell because each candidate UE that receives the CPI value will, in response to receiving the CPI value, execute a cell selection rule that if properly designed will cause the UE to move to another cell if the CPI value indicates that the cell is overloaded. Note that step 410, determining whether the UE is a candidate for being moved to another cell, may be performed before step 408. In such case, the access node first determines that a UE is a candidate UE and then opportunistically waits for data to send to the UE, so that steps 414 and 416 can be performed on condition that i=/=T.

Figure 5:
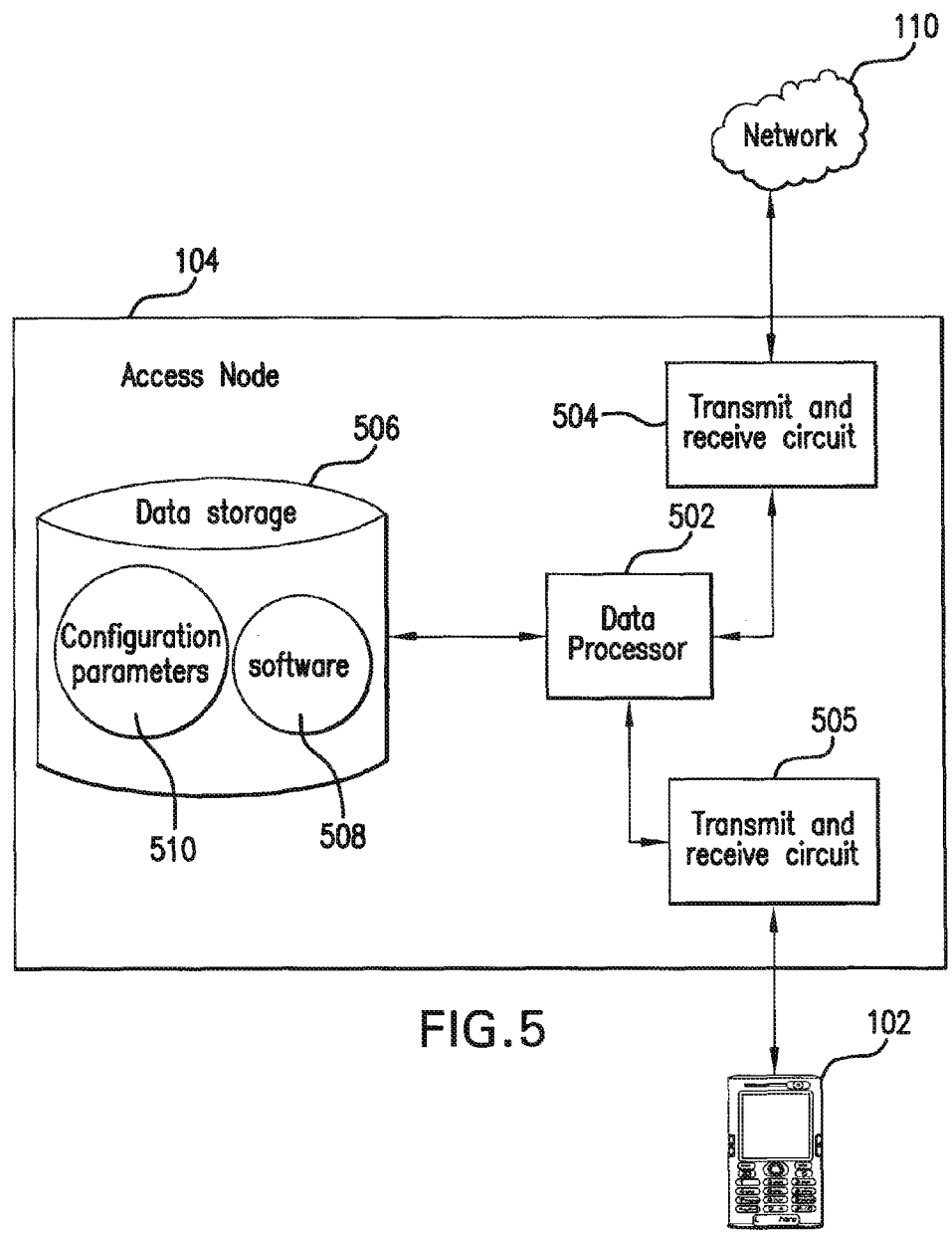
FIG. 5 is a functional block diagram of an access node according to some embodiments of the invention.

Referring now to FIG. 5, FIG. 5 is a functional block diagram of access node 104a according to some embodiments of the invention. As shown, access node 104a may comprise a data processing system 502 (e.g., one or more microprocessors, one or more integrated circuits, and/or one or more circuits for processing data), a data storage system 506 (e.g., one or more non-volatile and/or volatile storage devices) and computer software 508 stored on the storage system 506. Configuration parameters 510 may also be stored in storage system 506. Access node 104a also includes transmit/receive (Tx/Rx) circuitry 505 for transmitting data to and receiving data from UEs 102 and transmit/receive (Tx/Rx) circuitry 504 for transmitting data to and receiving data from, for example, network 110. Software 508 is configured such that when data processing system 502 executes software 508, access node 104a performs steps described above (e.g. steps described above with reference to the flow chart shown in FIGS. 3 and 4). For example, software 508 may include: (1) computer instructions for determining the load in a cell, (2) computer instructions for setting a CPI value based on the determined cell load, (3) computer instructions for including the CPI value in a message, and (4) computer instructions for transmitting (e.g. broadcasting or unicasting) the message.

Figure 6:
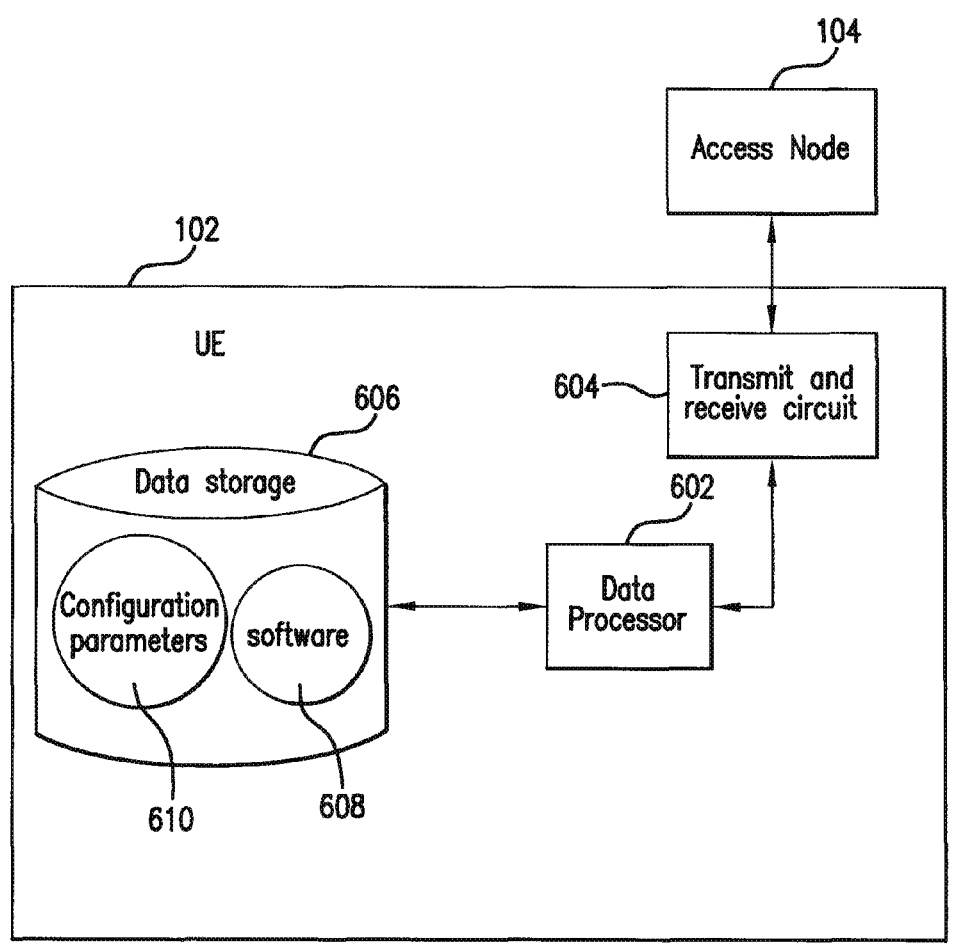
FIG. 6 is a functional block diagram of a UE according to some embodiments of the invention.

Referring now to FIG. 6, FIG. 6 is a functional block diagram of a UE 102 according to some embodiments of the invention. As shown, UE 102 may comprise a data processing system 602 (e.g., one or more microprocessors, one or more integrated circuits, and/or one or more circuits for processing data), a data storage system 606 (e.g., one or more non-volatile and/or volatile storage devices) and computer software 608 stored on the storage system 606. Configuration parameters 610 (e.g. the above described timer intervals) may also be stored in storage system 606. UE 102 also includes transmit/receive (Tx/Rx) circuitry 604 for transmitting data to and receiving data from an access node. Software 608 is configured such that when processor 602 executes software 608, UE 102 performs steps described above (e.g. steps described above with reference to the flow chart shown in FIG. 2). For example, software 608 may include computer instructions for executing a cell selection rule using a CPI value received from the access node.

While various embodiments of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for load balancing in a user equipment (UE), the method comprising:
    receiving at a UE a message comprising a cell selection rule, wherein the cell selection rule comprises:
        a selection condition, wherein the selection condition indicates one or more conditions under which the cell selection rule is to be applied; and
        a selection instruction, wherein the selection instruction indicates an order of cells;
    receiving at the UE a Radio Resource Control (RRC) message transmitted by an access node, the RRC message comprising a cell preference indicator (CPI) value;
    determining, based on the received CPI value, whether the selection condition is satisfied;
    in response to determining the selection condition is satisfied, selecting one of the first cell and a second cell based on the order indicated by the selection instruction; and
    connecting to the selected cell.

2. The method of claim 1, wherein the CPI value is a binary load indicator value that indicates whether the first cell is considered to be loaded or unloaded.

3. The method of claim 1, wherein the CPI value is a load indicator value that indicates one of three or more cell load levels.

4. The method of claim 1, wherein determining, based on the received CPI value, whether the selection condition is satisfied comprises generating a random or pseudo-random number and comparing the generated number with a value that is a function of the CPI value.

5. The method of claim 1, wherein:
    the access node is a 3GPP access node, and
    the second cell is serviced by a second access node that is not a 3GPP access node.

6. The method of claim 1, wherein receiving the CPI value comprises receiving a message broadcast from the access node on a broadcast channel (BCH) or a downlink shared channel (DL-SCH) or unicast from the access node, wherein the message includes the CPI value.

7. The method of claim 1, further comprising:
    setting a timer; and
    in response to the expiration of the timer, determining, based on a default CPI value whether to utilize the second cell.

8. The method of claim 1, further comprising:
    setting a timer if the first cell was selected; and
    in response to the expiration of the timer, determining, based on the received CPI value or a new CPI value, whether to continue utilizing the first cell.

9. A communication apparatus, comprising:
a transmit and receive circuit operable to:
- receive a message comprising a cell selection rule, wherein the cell selection rule comprises:
  - a selection condition, wherein the selection condition indicates one or more conditions under which the cell selection rule is to be applied; and
  - a selection instruction, wherein the selection instruction indicates an order of cells;
- receive a Radio Resource Control (RRC) message transmitted by an access node, the RRC message comprising a cell preference indicator (CPI) value; and a data processing system configured to:
- determine, based on the received CPI value, whether the selection condition is satisfied;
- in response to determining the selection condition is satisfied, select one of the first cell and a second cell based on the order indicated by the selection instruction; and
- connect to the selected cell.

10. The communication apparatus of claim 9, wherein the CPI value is a binary load indicator value that indicates whether the first cell is considered to be loaded or unloaded.

11. The communication apparatus of claim 9, wherein the CPI value is a load indicator value that indicates one of three or more cell load levels.

12. The communication apparatus of claim 9, wherein the data processing system is configured to determine whether the selection condition is satisfied by generating a random or pseudo-random number and comparing the generated number with a value that is a function of the CPI value.

13. The communication apparatus of claim 9, wherein:
the access node comprises a 3GPP access node, and
the second cell is serviced by a second access node that is not a 3GPP access node.

14. The communication apparatus of claim 9, wherein the transmit and receive circuit is configured to receive the CPI value by receiving a message broadcast from the access node on a broadcast channel (BCH) or a downlink shared channel (DL-SCH) or a unicast from the access node, wherein the message includes the CPI value.

15. The communication apparatus of claim 9, wherein the data processing system is further configured to:
set a timer; and
in response to the expiration of the timer, determine, based on a default CPI value whether to utilize the second cell.

16. The communication apparatus of claim 9, wherein the data processing system is further configured to:
set a timer if the first cell was selected; and
in response to the expiration of the timer, determine, based on the received CPI value or a new CPI value, whether to continue utilizing the first cell.

17. The communication apparatus of claim 9, wherein the cell selection rule is an Access Network Discovery and Selection Function (ANDSF) cell selection rule.

18. The method of claim 1, wherein the message comprising the cell selection rule was received from an Access Network Discovery and Selection Function (ANDSF) server.

* * * * *

UNITED STATES PATENT AND TRADEMARK OFFICE
CERTIFICATE OF CORRECTION

| | | |
|---|---|---|
| PATENT NO. | : 9,198,114 B2 | Page 1 of 1 |
| APPLICATION NO. | : 14/226154 | |
| DATED | : November 24, 2015 | |
| INVENTOR(S) | : Rune et al. | |

It is certified that error appears in the above-identified patent and that said Letters Patent is hereby corrected as shown below:

IN THE SPECIFICATION

In Column 1, Line 5, delete "2013" and insert -- 2013, now Pat. No. 8,687,486 --, therefor.

In Column 7, Line 7, delete "HE" and insert -- UE --, therefor.

In Column 7, Line 11, delete "HE" and insert -- UE --, therefor.

In Column 8, Line 32, delete "reevaluate" and insert -- re-evaluate --, therefor.

Signed and Sealed this
First Day of March, 2016

Michelle K. Lee
*Director of the United States Patent and Trademark Office*